May 29, 1923.
R. C. NEWHOUSE
THRUST BEARING
Filed Dec. 27, 1919
1,457,086
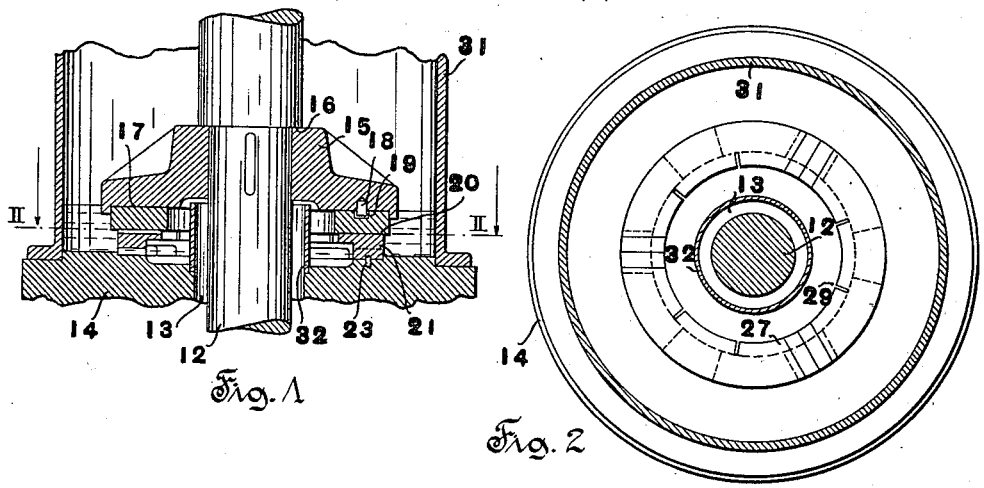
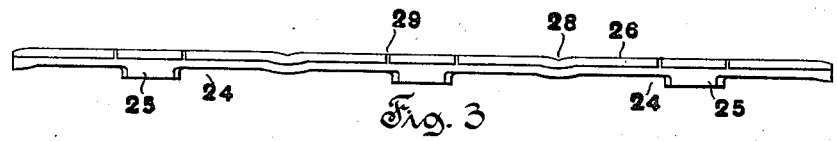
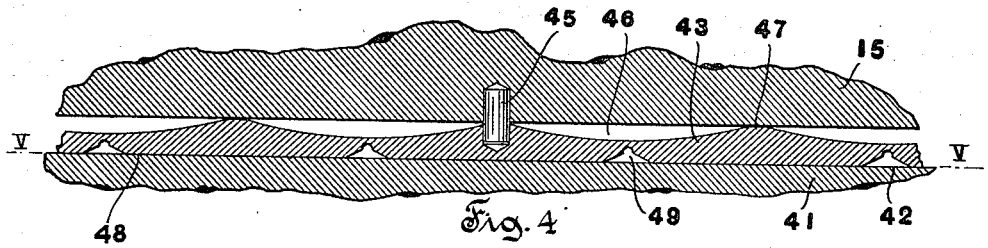
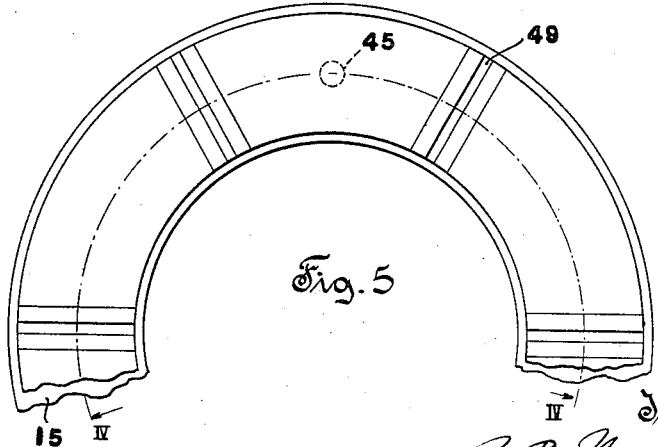

Patented May 29, 1923.

1,457,086

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

THRUST BEARING.

Application filed December 27, 1919. Serial No. 348,502.

*To all whom it may concern:*

Be it known that RAY C. NEWHOUSE, a citizen of the United States of America, residing at Wauwatosa, in the county of Milwaukee and State of Wisconsin, has invented a certain new and useful Improvement in Thrust Bearings, of which the following is a specification.

This invention relates in general to bearings and has particular relation to bearings, especially those of the thrust type, wherein special provisions are usually made for reducing friction through the production of a film of lubricating fluid under pressure between the relatively movable bearing surfaces.

It is an object of this invention to provide a thrust bearing of improved design and construction wherein desirable lubricating effects are secured through a film of oil under pressure developed and maintained between the active bearing surfaces.

It is a further object of this invention to provide a thrust bearing wherein the parts of the relatively movable bearing elements are of special design and construction to facilitate the production and maintenance of the desired film of oil under pressure between the active bearing surfaces during the operation of the shaft with which the bearing is associated.

It is a further object of this invention to provide a thrust bearing of the general type described wherein one of the cooperative bearing elements is in the form of a unitary element or member embodying parts of such design and construction as to contribute readily to the production and maintenance of a plurality of wedge-shaped films of oil between the active bearing surfaces of the relatively movable parts of the bearing, while, at the same time, providing that degree of strength and rigidity which insures the adequate support of the shaft and parts attached thereto without undesirable distortion, when these parts are at rest.

These and other objects and advantages are attained by this invention, various novel features of which will appear from the description and drawings, disclosing one or more embodiments of said invention, and will be more particularly pointed out in the claims.

Fig. 1 is a fragmentary, sectional elevation of apparatus provided with a thrust bearing embodying features of this invention.

Fig. 2 is a sectional plan view along the line II—II of Fig. 1.

Fig. 3 is a view in elevation of one of the active bearing elements of the structure shown in Fig. 1, such bearing element being developed.

Fig. 4 is a fragmentary, sectional elevation of a modification of the bearing shown in Fig. 1, the cooperative bearing elements being developed and the section being along the line IV—IV of Fig. 5.

Fig. 5 is a plan view, looking upward, of a portion of the modified bearing disclosed in Fig. 4.

In the embodiment of the invention disclosed in Figs. 1 to 3, inclusive, the shaft 12 may be considered as that of a vertical shaft machine of any desired character, and passes through a central opening 13 in a bearing support 14. An annular support or thrust collar 15 is secured to the shaft 12, preferably by being keyed thereto and held against a shoulder 16 thereon. The member 15 carries on its under side or is supported on an annular bearing element 17, being secured in operative relation thereto and held comparatively fixed relatively thereto, as by a dowel pin 18, secured to the collar 15, disposed in a slot 19 in the bearing element 17. The under side of the annular bearing element 17 is machined to provide a desired annular bearing surface 20.

The bearing support 14 is suitably machined to provide a seat for an annular bearing element 21, the latter being held in fixed relation to its support, as by one or more dowel pins 23 suitably cooperating with the parts. The under side of the bearing element 21 is recessed at 24 so as to provide a plurality of spaced, supporting projections 25, the part between these shoulders being of reduced thickness and strength and thus more readily deflectable from the normal plane or position occupied when the shaft is at rest or operating at a relatively low speed. Adjacent its upper or bearing surface 26, the bearing element 21 is provided with an annular extension 27 of reduced cross section at its radially inner side, this extension providing an enlargement of the bearing surface 26; and, due to its relatively reduced thickness, this extension 27 is resiliently yieldable or deflectable about its area of connection to the body portion of the element 21, which is indicated to be a surface concentric with the axis of the bearing.

The bearing surface 26 of the element 21 is grooved or chamfered, as indicated at 28, at points intermediate the supporting shoulders 25, this grooving or chamfering effect may be secured by swaging the material at these points. To further increase the flexibility of the radially inner portion of the bearing face of the element 21, the extension 27 is provided with radial cuts, as indicated at 29, on each side of each of the supporting projections 25, this provision contributing to render the parts of the extension intermediate the supporting projections 25 more easily bent or deflected about the body portion of the annular member 21.

A housing 31 is supported on the annular bearing support 14 in spaced relation to the active elements of the bearing. A sleeve 32 is secured to the support 14 at its inner edge about the opening 13 therein, this sleeve extending upwardly to a point beyond the active bearing surfaces of the relatively movable parts of the bearing. A chamber is thus formed between the housing 31, the sleeve 32 and the support 21, this chamber being filled with oil to a level appreciably above the active bearing surfaces of the relatively movable parts of the bearing and somewhat below the upper end of the sleeve 32. It will be apparent that circulation of this oil in a radial direction is readily permitted through the recesses 24 at the under side of the bearing element 21 and the grooves or chamfers 28 in the bearing face of such element.

When the shaft is at rest, it will be apparent that the bearing faces of both the body portion of the bearing element 21 and the inner extension therefrom are in the same plane, and the weight of the shaft and its attached parts is evenly distributed over the entire bearing surface of the bearing element 21, there being no appreciable tendency or inclination toward deflection of the radially inner extension 27. However, during operation, the lubricating fluid which readily enters and passes through the radial grooves 28 in the bearing surface 26 of the element 21 has considerable pressure developed thereon, due to centrifugal force acting thereon, and also the circumferential swirl or drag thereon due to the rotating element of the bearing. Due to the fact that the annular bearing element 17 is comparatively rigid and the design and construction of the bearing element 21 is such as permits deflection of parts thereof, especially those adjacent the radial grooves 28 and the radially inner edge of the extension 27, on the attainment of a sufficiently high speed, the oil pressure developed is sufficient to deflect portions of the bearing surface at these points and cause the formation of wedge-shaped films of oil between the active bearing surfaces. These wedge-shaped films decrease in thickness toward the supporting shoulders 25 in the direction of rotation, and are appreciably thicker at the radially inner edge of the bearing surface than at the outer edge thereof, due to the fact that the extension 27 is purposely designed to permit appreciable deflection. As will be apparent, these wedge-shaped films of oil are readily maintained under sufficient pressure during operation of the shaft at normal speed to lift and float the movable element of the bearing on a film of oil under pressure, thus preventing metal to metal contact between the active bearing elements and, hence, thus greatly reducing the friction losses.

In the modification of the invention shown in Figs. 4 and 5, the annular element 15 may be considered as mounted on a vertical shaft, as indicated in Fig. 1, and the bearing element 41 may be mounted in fixed relation to a bearing housing or other support. The bearing element 41 is provided with a bearing surface 42 designed for cooperation with an active bearing element 43 which is secured in operative relation to the annular member 15, so as to rotate therewith, the dowel 45 indicating one form of suitable attachment between the element 15 and the bearing element 43. This bearing element 43 is recessed at its upper or rear side, as indicated at 46, to provide spaced supporting portions or shoulders 47 and parts of reduced cross sectional area intermediate such shoulders. The under side of the bearing element 43 has a suitably machined bearing face 48 designed for cooperation with the bearing face 42 of the bearing element 41. At points intermediate the supporting shoulders 47, the bearing element 41 is grooved or chamfered radially on its bearing face, as indicated at 49, to produce an effect analogous to that produced by the grooves 28 in the bearing face of the bearing element 21 of the apparatus shown in Figs. 1, 2 and 3. It will be apparent that through the provision of the recesses 46 and the grooves 49, the material of the bearing element is considerably reduced in thickness at points intermediate the supporting shoulders 47, thus more readily permitting deflection or bending of the element 43 at these parts.

It will be apparent that, during operation of the shaft with which the bearing is associated, oil under pressure within the radial grooves 49 is effective to cause the deflection of those parts of the bearing element 43 adjacent the grooves 49 and to form wedge-shaped films of oil, with the point of the wedge extending oppositely to the direction of rotation, and, depending upon the speed of rotation, to develop sufficient pressure in these wedge-shaped films to move or float the movable part of the bearing and permit rotation of the same without metal to metal contact between the relatively movable parts.

It will be apparent that the invention disclosed is such as provides a thrust bearing construction capable of automatically causing the development of a film of lubricating material under pressure between the active bearing surfaces of the relatively movable bearing elements and maintaining such oil film during the normal operation of the bearing.

While the above explanation may not be exact as to all details of the physical effects attending the development and maintenance of the film of lubricating material under pressure between the active bearing surfaces of the bearing elements, nevertheless, it is certain that most desirable operating results may be secured by bearing structures embodying the present invention.

It should be understood that it is not desired that the invention claimed be limited to the exact details of construction shown and described, for obvious modifications may occur to persons skilled in the art.

It is claimed and desired to secure by Letters Patent:

1. A unitary bearing element having a bearing surface and comprising a plurality of circumferentially spaced relatively rigid and substantially non-deflectable portions having bearing faces, and a resiliently yieldable intermediate portion connecting said relatively rigid portions adjacent the bearing faces thereof, said intermediate portion being of reduced thickness in an axial direction and readily deflectable during operation of said bearing element to cause a tilting of a portion of the bearing surface of said element.

2. A bearing element having a bearing surface, and comprising a plurality of circumferentially spaced, relatively rigid and substantially non-deflectable supporting portions having bearing faces, and a portion intermediate said supporting portions and integral therewith, said intermediate portion being deflectable to move portions of the bearing surface of said bearing element out of the normal plane of said bearing surface.

3. A bearing element having a bearing surface, and comprising a plurality of circumferentially spaced, relatively rigid and substantially non-deflectable supporting portions, said bearing element being recessed on the side opposite the bearing surface thereof at a point intermediate said supporting portions to produce intermediate portions of reduced thickness in an axial direction, and each said recessed portion being deflectable to move the bearing face thereof out of the plane of the bearing faces of said supporting portions.

4. A bearing element having a bearing surface, and comprising a plurality of circumferentially spaced, supporting portions, and intermediate portions integral with said supporting portions, said intermediate portions serving to connect said supporting portions adjacent the bearing faces thereof and being provided with grooves at the bearing faces thereof and being of reduced bending strength adjacent said grooves and deflectable to move the bearing faces thereof out of the normal general plane of the bearing surface of said bearing element.

5. A bearing element having a bearing surface, and comprising a plurality of circumferentially spaced, relatively rigid supporting portions, and intermediate portions integral with said supporting portions, the side of said bearing element opposite the bearing surface thereof being recessed at points opposite said intermediate portions, and said intermediate portions being provided with substantially radially disposed grooves at the bearing face thereof and being deflectable so as to move the bearing faces of the portions of said element adjacent said grooves out of the general plane of the bearing faces of the supporting portions.

6. A bearing element having a bearing surface, and comprising a one-piece thrust ring having a plurality of relatively rigid and substantially non-deflectable portions having bearing faces, and portions of reduced bending strength intermediate and connecting said first portions and deflectable so as to move the bearing faces of said intermediate portions out of the general plane of the bearing faces of said relatively rigid portions.

7. In a bearing, cooperative bearing elements having mutually engageable bearing surfaces, one of said bearing elements comprising a one-piece thrust ring having a plurality of relatively rigid and substantially non-deflectable bearing portions provided with bearing faces separated by substantially radially extending lubricating grooves, said ring being recessed on the side opposite its bearing surface at points adjacent said grooves, whereby the portions adjacent said grooves are yieldable and deflectable to move the bearing faces of said latter portions out of the normal plane of the bearing surface of said ring.

8. A bearing, comprising relatively movable bearing elements having cooperative bearing surfaces, one of said elements being in the form of a ring having a plurality of relatively rigid and substantially non-deflectable portions having bearing faces, and intermediate portions each integral with a pair of said relatively rigid portions and cut away at the side opposite the bearing face thereof to thereby reduce the bending strength thereof, said intermediate portions being deflectable to change the position of portions of the bearing surface of said ring.

9. A bearing, comprising relatively movable bearing elements having cooperative bearing surfaces, one of said bearing elements being in the form of a ring recessed at the side opposite its bearing surface to provide a plurality of relatively rigid and substantially non-deflectable supporting portions having bearing faces, and yieldable connecting portions intermediate said supporting portions, said intermediate portions being provided at the bearing faces thereof with substantially radial grooves opposite the recesses in said ring, said intermediate portions being readily deflectable during operation of said bearing to move portions of the bearing surface of said ring adjacent said intermediate portions out of the normal plane of said bearing surface.

10. A thrust bearing element having a bearing surface, and comprising a body portion, and a yieldable extension located at the radially inner side of said body portion, said extension being of reduced bending strength and deflectable along a curved surface concentric with the axis of rotation of said element to change the plane of a portion of the bearing surface of said element.

11. A thrust bearing element having a bearing surface, and comprising a body portion, and a resiliently yieldable extension at the radially inner side of said body portion adjacent the bearing surface thereof, said extension being provided with transverse slots to increase the yielding effect of a portion of said extension between adjacent slots.

12. A thrust bearing, comprising relatively rotatable elements having cooperative bearing surfaces, one of said elements including a body portion and a yieldable portion extending radially inward from said body portion and having its bearing surface normally occupying substantially the same plane as the bearing surface of said body portion, said extending portion being more readily distortable from normal position than a part of said body portion and being deflectable along a curved surface concentric with the axis of said relatively rotatable bearing elements to shift the bearing face of said extending portion out of the normal plane of the bearing surface of said bearing element.

13. A thrust bearing element in the form of a one-piece ring having a bearing surface, and comprising a body portion, and an extension of reduced bending strength projecting from said body portion at the radially inner side thereof, the bearing faces of said body portion and said extension being normally coincident, and said extension being deflectable about the point of connection thereof to said body portion.

14. A thrust bearing in the form of a one-piece ring having a bearing surface, and comprising a body portion, and an extension therefrom at the radially inner side thereof, the planes of the bearing faces of said body portion and said extension being normally coincident, and said extension being provided with transverse slots whereby the portions of said extension between said slots are readily deflectable from the normal plane of the bearing surface of said ring.

15. A thrust bearing member in the form of a one-piece ring having a bearing surface, and comprising a body portion recessed at spaced points at the side opposite the bearing face of said member, and an extension from said body portion at the radially inner side thereof, said extension being deflectable about its point of connection with said body portion, and said body portion being deflectable at the recessed portions.

16. A thrust bearing, comprising relatively rotatable members having cooperative bearing surfaces, one of said members being in the form of a one-piece ring comprising a body portion recessed at spaced points at the side opposite its bearing face, and an extension from said body portion at the radially inner side thereof, said extension being provided with a bearing face coincident with that of said body portion, and said ring being provided with substantially radial grooves extending across the bearing faces of said extension and the recessed part of said body portion.

17. A thrust bearing, comprising relatively rotatable members having cooperative bearing surfaces, one of said members being in the form of a ring comprising a body portion recessed at spaced points at the side opposite its bearing face, and an extension from said body portion at the radially inner side thereof and adjacent the bearing face thereof, said extension having transverse slots therethrough at points adjacent the circumferential ends of the recesses in said body portion.

18. A thrust bearing, comprising relatively rotatable members having cooperative bearing surfaces, one of said members comprising a body portion recessed at spaced points at the side opposite its bearing face, and a resiliently yieldable extension from said body portion at the radially inner side thereof, the bearing faces of said body portion and said extension lying normally in the same plane and being provided with substantially radial grooves opposite the recesses in said body portion, said extension being slotted at points adjacent the unrecessed portions of the body portion whereby the parts of said extension between said slots are readily deflectable about the points of connection of said extension to said body portion, and said ring as a whole being deflectable at points adjacent said grooves to move portions of the bearing surface of said body portion out of the normal plane of the bearing faces of the unrecessed parts of said body portion.

19. In a thrust bearing, relatively rotatable bearing elements, one of said elements being provided with a bearing surface, and an additional bearing element interposed between said first mentioned bearing elements and provided with a bearing surface in cooperative engagement with the bearing face of one of said first mentioned bearing elements, said additional bearing element being stationary relative to the other of said first mentioned bearing elements and supported thereby at circumferentially spaced points, unsupported portions of said additional bearing element being deflectable during operation of said bearing to move portions of the bearing surface of said element out of its normal plane.

20. In a thrust bearing, relatively rotatable bearing elements, one of said elements being provided with a bearing surface, and an additional bearing element interposed between said first mentioned bearing elements and provided with a bearing surface in cooperative engagement with the bearing surface of one of said first mentioned bearing elements, said additional bearing element being supported at its radially outer part by and being stationary relative to the other of said first mentioned bearing elements, and portions of said additional bearing element at the radially inner edge thereof being unsupported at the side opposite its bearing face and deflectable during operation of said bearing to move portions of the bearing surface of said element out of its normal plane.

21. In a thrust bearing, relatively rotatable bearing elements, one of said elements being provided with a bearing surface, and an additional bearing element interposed between said first mentioned bearing elements and provided with a bearing surface in cooperative engagement with the bearing surface of one of said first mentioned bearing elements, said additional bearing element being stationary relative to the other of said first mentioned bearing elements and supported thereby at circumferentially spaced points at its radially outer side, and portions of said additional bearing element adjacent the radially inner edge thereof being unsupported at the side opposite its bearing surface and deflectable during operation of said bearing to move portions of the bearing surface thereof from its normal plane.

22. A bearing element having a bearing surface, and comprising a plurality of circumferentially spaced, relatively rigid and substantially non-deflectable supporting portions having bearing faces, and deflectable portions extending from said supporting portions and provided with bearing faces, extending portions on adjacent supporting portions being joined together adjacent their bearing faces.

23. A bearing element having a bearing surface, and comprising a plurality of circumferentially spaced, relatively rigid and substantially non-deflectable supporting portions, said bearing element being recessed on its axial side opposite the bearing surface thereof at points intermediate said supporting portions to produce intermediate portions of reduced thickness in an axial direction, said intermediate portions forming a union between adjacent supporting portions and having bearing faces deflectable out of the general plane of the bearing surface of said bearing element.

24. A bearing element having a bearing surface, and comprising a one-piece thrust element having a plurality of spaced, relatively rigid and substantially non-deflectable portions, and portions intermediate and forming a connection between adjacent relatively rigid portions, said relatively rigid portions and intermediate portions having bearing faces normally in substantial alinement, and said intermediate portions being deflectable so as to shift their bearing faces out of the general plane of the bearing faces of said relatively rigid portions.

25. A bearing element having a bearing surface, and comprising a plurality of bearing shoes, each of said shoes having a relatively rigid supporting portion and circumferentially extending projections therefrom, each of said extensions having a bearing face and being united directly to the extension of an adjacent shoe and being deflectable out of its normal position during operation of the bearing.

26. A bearing element having a bearing surface, and comprising a plurality of integral bearing shoes, each of said shoes having a relatively rigid supporting portion and being recessed to form deflectable extensions at the bearing faces of said shoe, an extension on one shoe being united directly to an extension on an adjacent shoe.

27. A bearing element having a bearing surface, and comprising a plurality of bearing shoes, each of said shoes having a relatively rigid intermediate portion, and deflectable extensions on said shoes adjacent the bearing surface thereof, extensions of adjacent shoes being directly united.

28. In a thrust bearing for a shaft, relatively rotatable bearing elements having opposed cooperative bearing surfaces, one of said bearing elements comprising a circumferential series of axially deflectable bearing portions, and relatively rigid portions between and supporting said deflectable portions, each of said deflectable portions having an intermediate, substantially radial lubricating groove and extending radially inward beyond said relatively rigid portions whereby the radially inward parts of said deflectable portions are of increased flexibility.

In testimony whereof, the signature of the inventor is affixed hereto.

RAY C. NEWHOUSE.